Patented Oct. 7, 1947

2,428,614

UNITED STATES PATENT OFFICE 2,428,614

NITRONITRILES

Gerard Dunstan Buckley and Royden Lewis Heath, Blackley, Manchester, England, assignors to Imperial Chemical Industries Limited, a corporation of Great Britain No Drawing. Application October 4, 1945, Serial No. 620,391. In Great Britain October 9, 1944

4 Claims. (Cl. 260—464)

This invention relates to the manufacture of new nitronitriles and more particularly it relates to the manufacture of compounds of the formula

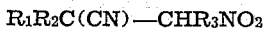

wherein $R_1$, $R_2$ and $R_3$ may be hydrogen or alkyl radicals.

According to our invention we provide a process for the manufacture of compounds of the said formula which comprises causing a $\Delta^\alpha$-nitroolefine of the formula

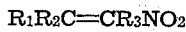

wherein $R_1$, $R_2$ and $R_3$ have the significance given above, to react with an alkali metal cyanide, and then acidifying the reaction product.

$\Delta^\alpha$-Nitroolefines which may be used in the process of the invention include for example $\alpha$-nitroisobutene, nitroethylene, 1-nitro-1-propene, 2-nitro-1-propene and 2-nitro-2-butene. Besides the $\Delta^\alpha$-nitroolefines themselves there may be used substances which readily give rise to $\Delta^\alpha$-nitroolefines for example esters of those alcohols which may be regarded as derived by addition of water to $\Delta^\alpha$-nitroolefines, for example nitrotertiarybutyl acetate.

Alkali metal cyanides which may be used in the process of the invention include for example sodium cyanide and potassium cyanide. The alkali metal cyanide may be partly replaced by hydrogen cyanide.

The reaction may usually be carried out merely by mixing the reactants at atmospheric temperature. Advisedly the reactants are each dissolved in a suitable solvent. A suitable solvent for the alkali metal cyanide is water. The solvent used for dissolving the nitroolefine is preferably one which, besides being capable of dissolving the nitroolefine is miscible with the solvent, for example water used for dissolving the cyanide. Thus there may be used for example methanol, ethanol, acetone or dioxan. When the reaction is complete the reaction product, consisting wholly or in part, according as hydrogen cyanide is used or not, of a salt of the desired nitronitrile, is acidified, for example with a mineral acid, to liberate the free nitronitrile. The nitronitrile is then isolated from the mixture by conventional methods.

The nitronitriles so obtained are useful as intermediates for the manufacture of dyestuffs and pharmaceutical compounds.

The invention is illustrated but not limited by the following example in which parts are by weight:

Example 1

101 parts of $\alpha$-nitroisobutene are dissolved in 450 parts of ethanol and the solution is added dropwise to a vigorously stirred solution of 65 parts of potassium cyanide in 450 parts of water kept by external cooling at 15–20° C. When the addition is complete stirring of the reaction mixture is continued for a further 3 hours. The mixture is then further cooled to 5–10° C. and a solution of 100 parts of concentrated hydrochloric acid in 300 parts of water is added slowly. The crystalline deposit is then filtered off and recrystallised from ether. It consists of 1-nitro-2-cyano-2-methylpropane.

Example 2

8.7 parts of 1-nitro-1-propene are dissolved in 40 parts of ethanol and the solution is added dropwise to a stirred solution of 6.5 parts of potassium cyanide in 50 parts of water at −5° C. to 0° C. When the addition is complete, stirring is continued for a further 2 hours. There is then added gradually a solution of 12 parts of concentrated hydrochloric acid in 12 parts of water. The mixture is then evaporated to about half its volume and the residue is extracted with ether. The ethereal solution is dried and distilled and 1-nitro-2-cyanopropane, B. P. 65–70° C./0.1 mm., is obtained.

Example 3

50 parts of 2-nitro-1-propene are dissolved in 500 parts of ethanol and the solution is added dropwise to a well stirred solution of 28.2 parts of sodium cyanide in 300 parts of water at −5° C. to 0° C. When the addition is complete, stirring is continued for a further 2 hours. There is then added gradually a solution of 72 parts of concentrated hydrochloric acid in 72 parts of water. The mixture is evaporated to about one third its volume and the residue is extracted with ether. The ethereal solution is dried and distilled and 2-nitro-1-cyanopropane, B. P. 72° C./0.3 mm., is obtained.

Example 4

58 parts of 2-nitro-2-butene are dissolved in 500 parts of ethanol and the solution is added dropwise to a vigorously stirred solution of 38 parts of potassium cyanide in 300 parts of water at 10° C. to 20° C. When the addition is complete, stirring of the reaction mixture is continued for a further 4 hours. The mixture is then cooled to 5° C.–10° C. and a solution of 70 parts of concentrated hydrochloric acid in 70 parts of water is added slowly. The mixture is evaporated to dryness and the residue is extracted with ether. The ethereal solution is dried and distilled and 2-nitro-3-cyanobutane, B. P. 55–60° C./0.07 mm., is obtained.

*Example 5*

10.1 parts of α-nitroisobutene are added dropwise to a solution at 10° C. of 6 parts of hydrocyanic acid and 0.065 part of potassium cyanide in 50 parts of ethanol. When the addition is complete the reaction mixture is stirred for a further 24 hours at 20° C. There are then added 50 parts of water followed by sufficient dilute (7%) hydrochloric acid at 5–10° C. to render the mixture acid to Congo red. The crystalline deposit is filtered off and recrystallised from ether. It consists of 1-nitro-2-cyano-2-methylpropane.

*Example 6*

8 parts of nitro-tert.-butyl acetate are added dropwise to a vigorously stirred solution of 4 parts of potassium cyanide in 25 parts of water at 30° C. When the addition is complete the mixture is stirred at 30° C. for a further 16 hours. The mixture is then cooled to 5° C.–10° C. and a solution of 8 parts of concentrated hydrochloric acid in 8 parts of water is added thereto slowly. The crystalline deposit is filtered off and recrystallised from ether. It consists of 1-nitro-2-cyano-2-methylpropane.

We claim:
1. New nitronitriles of the formula

$$R_1R_2C(CN)-CHR_3NO_2$$

wherein $R_1$, $R_2$ and $R_3$ are selected from the group consisting of hydrogen and lower alkyl radicals.

2. Process for the manufacture of nitronitriles of the formula $$R_1R_2C(CN)-CHR_3NO_2$$

wherein $R_1$, $R_2$ and $R_3$ are selected from the group consisting of hydrogen and lower alkyl radicals which comprises causing a $\Delta^\alpha$-nitroolefine of the formula $$R_1R_2C=CR_3NO_2$$

wherein $R_1$, $R_2$ and $R_3$ have the significance given above, to react with an alkali metal cyanide, and then acidifying the reaction product.

3. Process according to claim 2 wherein the alkali metal cyanide is partly replaced by hydrogen cyanide.

4. Process for the manufacture of nitronitriles of the formula $R_1R_2C(CN)-CHR_3NO_2$ which comprises causing a $\Delta^\alpha$-nitroolefine of the formula $R_1R_2C=CR_3NO_2$ to react with an alkali metal cyanide, and then acidifying the product, said nitroolefine being formed in situ from an ester of an alcohol of the formula $$R_1R_2C(OH)-CHR_3NO_2$$

$R_1$, $R_2$ and $R_3$ in each formula being selected from the group consisting of hydrogen and lower alkyl radicals.

GERARD DUNSTAN BUCKLEY.
ROYDEN LEWIS HEATH.

REFERENCES CITED

The following references are of record in the file of this patent:

UNITED STATES PATENTS

| Number | Name | Date |
|---|---|---|
| 2,188,340 | Dykstra | Jan. 30, 1940 |
| 2,328,370 | Wiest | Aug. 31, 1943 |
| 2,361,259 | Bruson | Oct. 24, 1944 |

OTHER REFERENCES

Steinkopff et al., "Berichte (Deutsch. Chem. Gesell.)" Vol. 41, pages 1047–1049 (1908).

Wieland et al., "Berichte (Deutsch. Chem. Gesell.)" Vol. 63B, page 405 (1930).

Ser. No. 404,150, Wulff et al. (A. P. C.) pub. Apr. 20, 1943.